United States Patent [19]
Oscarsson

[11] Patent Number: 5,245,784
[45] Date of Patent: Sep. 21, 1993

[54] RODENT AND SMALL ANIMAL TRAP

[76] Inventor: Rolf A. Oscarsson, 1550 Winchell Dr., Hudson, Ohio 44236

[21] Appl. No.: 915,667

[22] Filed: Jul. 21, 1992

[51] Int. Cl.⁵ .................................................. A01M 23/18
[52] U.S. Cl. .................................................. 43/60; 43/67
[58] Field of Search ................................ 43/60, 61, 67

[56] References Cited

U.S. PATENT DOCUMENTS

| | | | |
|---|---|---|---|
| 4,144,667 | 3/1979 | Souza | 43/61 |
| 4,393,616 | 7/1983 | Kaufman et al. | 43/60 |
| 4,462,181 | 7/1984 | Broman | 43/61 |
| 4,557,067 | 12/1985 | Ha | 43/61 |
| 4,688,348 | 8/1987 | Chu | 43/61 |

*Primary Examiner*—Mark Rosenbaum
*Assistant Examiner*—Chuck Y. Mah
*Attorney, Agent, or Firm*—Oldham, Oldham & Wilson

[57] ABSTRACT

A disposable rodent trap for use with a spring for biasing the trap to a closed position. The trap has a ramp as a trigger, and trigger posts with hinges which when set in collinear alignment, cause the trap to spring close at a movement of the triggering ramp.

4 Claims, 5 Drawing Sheets

RODENT AND SMALL ANIMAL TRAP

BACKGROUND OF THE INVENTION

The everyday mouse trap, wooden with the copper wire and spring is very temperamental to set and handle, to the point where people will not use it for that reason, and instead resort to other means such as poisons and glue traps. Poisons having other environmental problems with children and pets. And the glue trap basically having the same draw backs. The standard mouse trap having ten pieces, made out of wood, steel and copper. This takes with it the problem of inventory and assembly of the product. The invention takes all this in to consideration by eliminating all pieces except two, the body and the spring still being there, the body having all functions integral to it.

SUMMARY OF THE INVENTION

The foregoing advantages are accomplished and the shortcomings of the prior art are overcome by using living hinges, which comprises of a thin designated section that will act as a hinge, and by also using past center posts in the triggering mechanism again with living hinges making the unit one piece except for the one spring. This making the unit extremely easy to assemble.

BRIEF DESCRIPTION OF DRAWINGS

A better understanding of this trap invention will be afforded by reference to the drawings herein.

DESCRIPTION OF THE EMBODIMENT

Proceeding to a detailed description of the embodiment of the invention.

Figure 1:
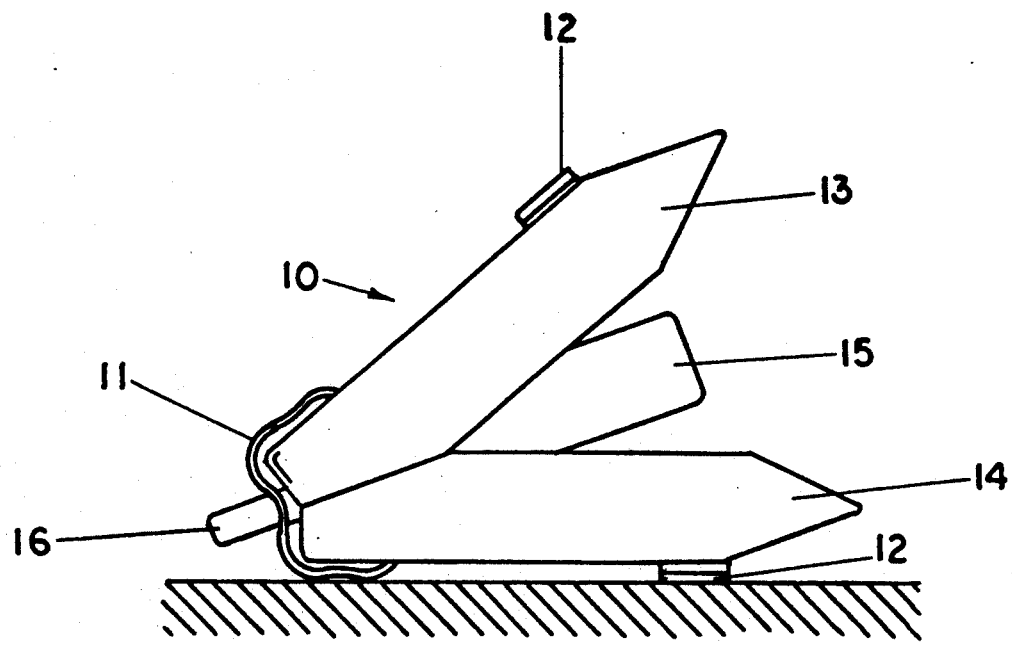
FIG. 1. This is a side elevation of the trap of this invention opened and set and setting on a surface.

FIG. 1. Shows the device opened and set. Resting on spring 11 and the finger tabs 12 with the outer side wall 13 and inner sidewall 14 as well as the triggering ramps 17 side wall 15. having the setting section 16 of the triggering mechanism showing through the spring 11.

Figure 2:
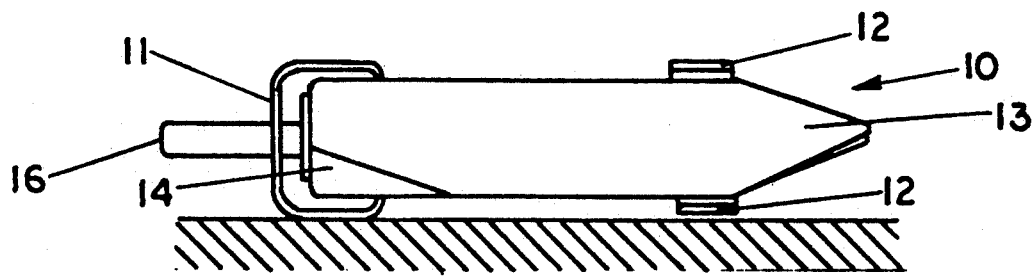
FIG. 2. This is a side elevation of the trap of this invention closed and sprung and setting on a surface.

FIG. 2. Shows the trap 10 of this invention in its closed and sprung position resting on the spring 11 and the finger tabs 12 similar to FIG. 1 except that the triggering ramp 17 with its side walls 15 can not be seen.

Figure 3:
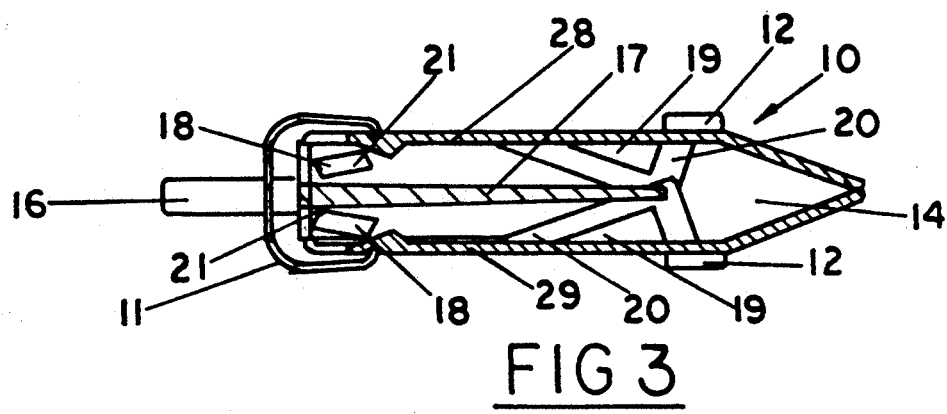
FIG. 3. This is a view similar to FIG. 2 except with side walls removed and portions shown in section.

FIG. 3. Is a view similar to FIG. 2 except that the outer side wall 13 and the inner side wall 14 as well as the triggering ramps 17 and side wall 15 are removed, showing how the trap 10 of this invention looks internally when it is closed and sprung, with the trigger posts 18 in their sprung position, with portions shown in section.

Figure 4:
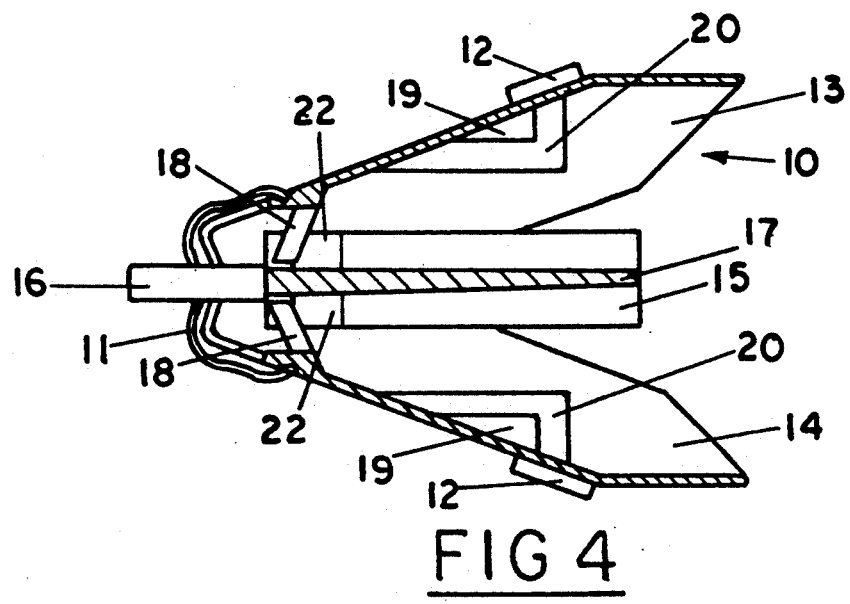
FIG. 4. This is a view similar to FIG. 1 except with the side walls removed and portions shown in section.

FIG. 4. Is a view of the trap 10 of this invention with the outer side wall 13 and the inner side wall 14 removed to show the triggering ramp 17 with its sidewall 15 removed. The trigger posts 18 in its open and set position and the relationship to small trigger rail 19 and large trigger rail 20.

Figure 5:
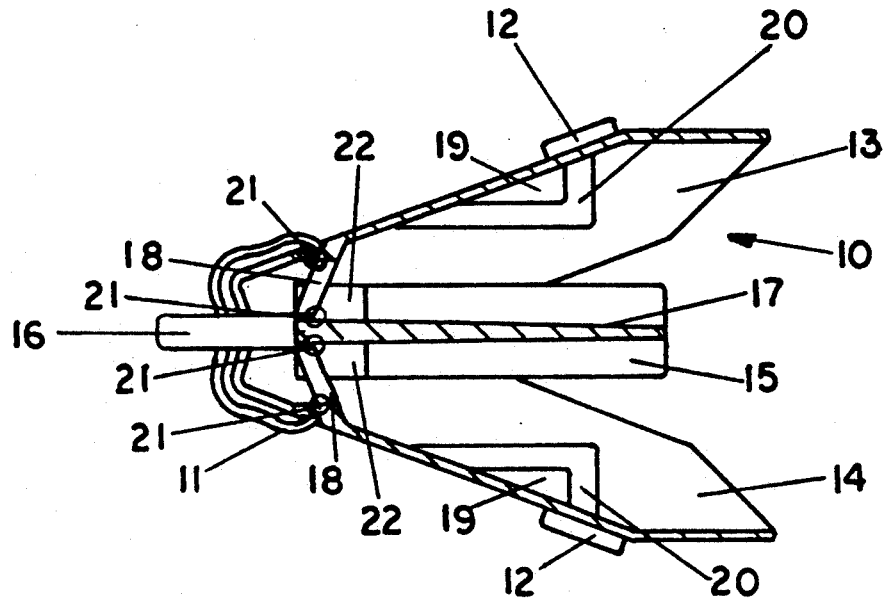
FIG. 5. This is a view similar to FIG. 4 except with the triggering mechanism hinge points marked.

FIG. 5. Is a view similar to FIG. 4 except for its trigger posts 18 hinge points 21 are clearly marked.

Figure 6:
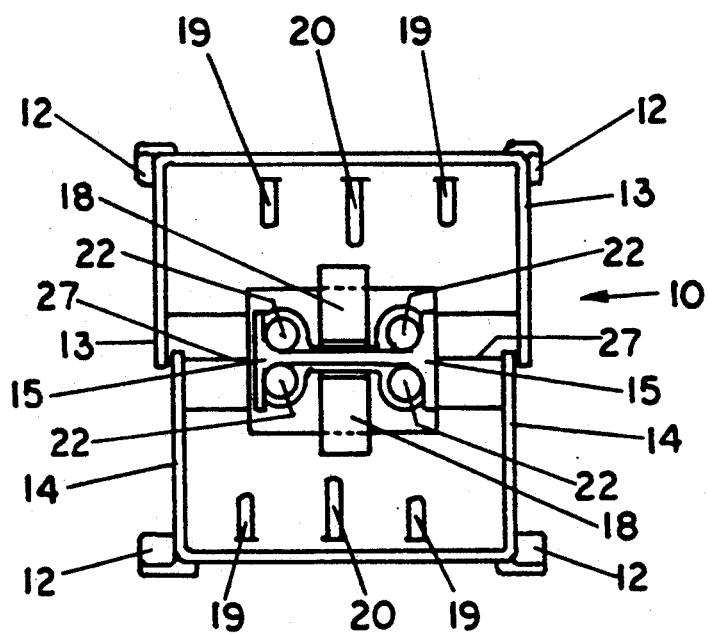
FIG. 6. This is a view of the trap of this invention opened and set from the front looking into the mouth of it.

FIG. 6. Is a view of the trap 10 of this invention looking into the mouth of the trap 10 showing bait wells 22 on both sides of the triggering ramp 17 Also the outer enclosure 28 inner enclosure 29 and hinge point 27.

Figure 7:
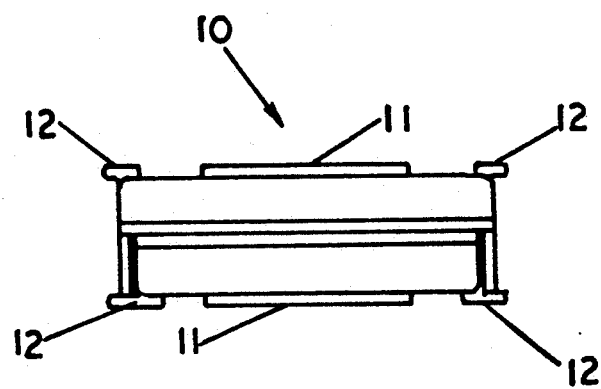
FIG. 7. This is a front view of the trap of this invention closed and sprung.

FIG. 7. Is a view of the trap 10 of the invention similar to FIG. 6 except in this view the trap 10 is in its closed and sprung position.

Figure 8:
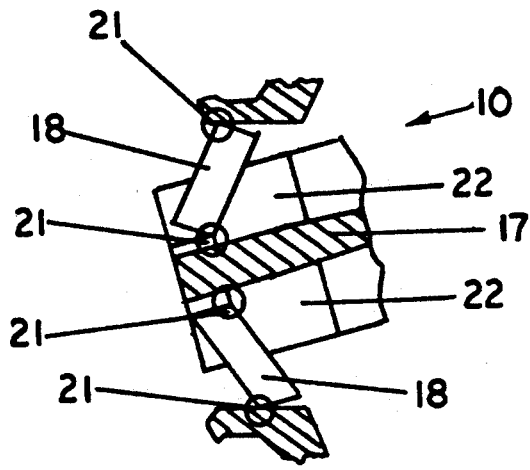
FIG. 8. This is a enlarged section view of the triggering mechanism as shown in FIG. 5 of the trap of this invention.

FIG. 8. Is an enlarged view of the triggering posts 18 triggering ramp 17 and the triggering hinge points 21 as well as the over center dimension 23 shown in FIG. 8 in the open and set position of the trap 10.

Figure 9:
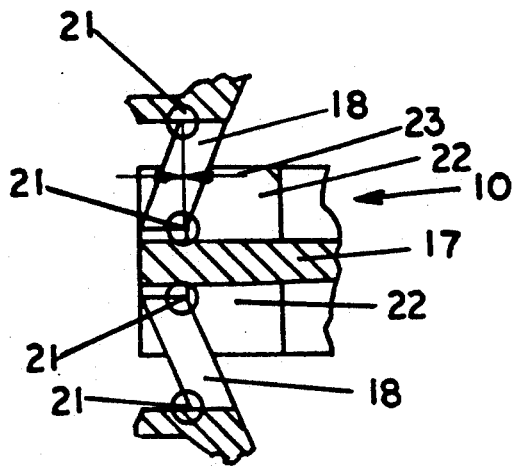
FIG. 9. This is a view similar to FIG. 8 except the triggering mechanism is tripped and starting to close.

FIG. 9. Is a view similar to FIG. 8 except that the upper most triggering post has been removed (triggered) over past the center dimension 23 and therefore in a closing mode.

Figure 10:
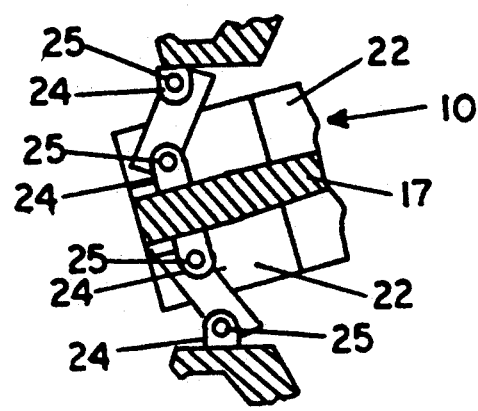
FIG. 10. This is a view similar to FIG. 9 except the hinge points of the triggering mechanism are made up of pins instead of living hinge points.

FIG. 10. Is a view similar to FIG. 9 except that the trigger post 18 and hinge point 21 have been replaced with a conventional hinge arrangement 24 with holes and pin 25 making it have more parts but the same function.

Figure 11:
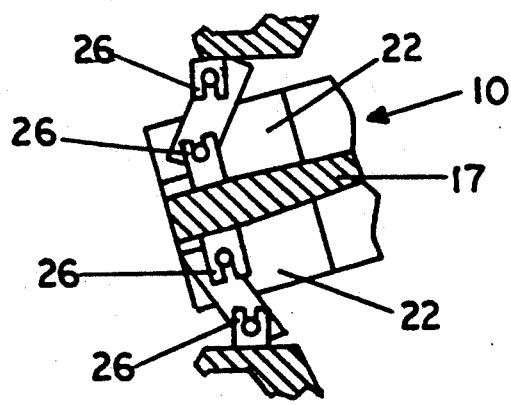
FIG. 11. This is a view similar to FIG. 9 except the hinge points of the triggering mechanism are made up of snap together hinge points instead of living hinge points.

FIG. 11. Is a view similar to FIG. 9 except that the trigger post 18 and hinge point 21 have been replaced with a snap in hinge arrangement 26 making it have more parts. but the same function.

OPERATION

A better understanding of the advantages of the trap 10 will be had by a description of its operation. Referring to the trap 10 will be packaged as shown in FIG. 2. Closed and sprung position. To open and to set trap grasping the finger tabs 12 with the middle fingers and thumbs putting one index finger on the setting section 16 of the triggering mechanism, while pulling the two halves outer sidewall 28 and inner sidewall 29 apart, hinged on 27, exert some light pressure on the setting section 16 of the triggering mechanism, and there by bringing the triggering post 18 to the full open and set position with the triggering hinge points 21 past centers 23, now let up on pressure pulling the outer half 28 and inner half 29 while still exerting light pressure on the setting section 16 of the triggering mechanism. The trap 10 of the invention is now open and set.

Place the trap 10 of this invention on its side or on either of its halves as described in FIG. 1.

The bait wells 22 will be baited with a aromatic substance luring the animals into the trap 10 of this invention. As the animal enters trap 10 to get the aromatic substance that is in bait well 22 it will have to move triggering ramp 17, or between inner side wall 14 and ramp 17, either of the two movements will spring trap 10 to closed position, trapping and holding the animal.

FIGURE NUMBER DESCRIPTION

FIG. 1. through FIG. 11.
10. Trap.
11. Spring.
12. Finger Pull Tabs.
13. Outer Side Wall.
14. Inner Side Wall.
15. Ramp Side Wall.
16. Setting Section.
17. Triggering Ramp.
18. Trigger Post.
19. Small Trigger Rail.
20. Large Trigger Rail.
21. Hinge Points.
22. Bait Wells.
23. Over Center Dimensions.
24. Hinge Arrangement.
25. Hinge Pins.
26. Snap In Hinge Arrangement.
27. Outer and Inner Enclosure Hinge Point.
28. Outer Enclosure.
29. Inner Enclosure.

Applicant's invention for this rodent or small animal trap is essentially comprised of two pieces, which are a spring clamp and a body portion. The body portion may be constructed from any injection moldable material, but is preferably a polymeric material. Use of such material allows formation of living hinges from thin sections of trap material for repositionally coupling the sidewalls, trigger posts or ramp portions.

The triggering mechanism with triggering posts having hinge points coupling a triggering ramp disposed between the sidewalls of the trap is also repositionably coupled by use of such living hinges. But in an another embodiment of the invention, the hinges and hinge points may be constructed as standard hinge pin hinges. A third embodiment of the trap incorporates projections and correponding slots at the hinge points, so that the hinges and hinge points would be formed as snap together hinges.

I claim:

1. A disposable rodent trap constructed of a polymeric material and having an open, set or loaded position, a triggered position, and a closed or sprung position, the trap being adapted for use with a spring or other resilient member biasing the trap toward the closed position, comprising:

a pair of sidewalls each having inner and outer surfaces and the sidewalls repositionably coupled at an end of each sidewall; said sidewalls adapted to pivot against one another, and dimensioned as an inner sidewall and outer sidewall to fit together and form a complete enclosure when the trap is in the closed position to secure a rodent therein;

a hinge associated with an end of each sidewall adapting said sidewalls to pivot from said open position to said closed position;

a plurality of trigger rails projecting inward from said inner surface of each of said sidewalls;

a repositionable triggering ramp with first and second ends, with a plurality of bait wells for holding bait positioned adjacent said triggering ramp between said first and second ends of the triggering ramp; a setting section at said first end which extends outside the trap and a ramp section at said second end disposed between said sidewalls, and a plurality of trigger posts with hinge points at each of the ends thereof repositionably coupling the ramp to each of the sidewalls; said hinge points adapted for alignment to be collinear concomitant with alignment of the trigger posts to provide stability against the bias of the spring and to set and retain the trap in said open position, such that a movement of said inner sidewall, outer sidewall, or the triggering ramp moves said hinge points from said collinear alignment to destabilize said trigger posts, and bias of said spring against the sidewalls triggers the trap to tightly clamp the trap in said closed position.

2. The trap of claim 1, wherein the hinge and the hinge points comprise a living hinge formed of polymeric material.

3. The trap of claim 1, wherein the hinge and the hinge points comprise hinge pin hinges.

4. The trap of claim 1, wherein the hinge and the hinge points are formed by projections and corresponding slots adapted to snap lock together for repositionably coupling said sidewalls and for repositionably coupling the trigger posts to the ramp and the sidewalls.

* * * * *